(12) United States Patent
Saari et al.

(10) Patent No.: US 6,921,026 B2
(45) Date of Patent: Jul. 26, 2005

(54) PRESERVATION OF INTERMEDIATE MOISTURE FOODS BY CONTROLLING HUMIDITY AND INHIBITION OF MOLD GROWTH

(76) Inventors: Albert L. Saari, 16305 15th Ave. No., Plymouth, MN (US) 55447; Robert L. Esse, 3502 134th St., Monticello, MN (US) 55362

( * ) Notice: Subject to any disclaimer, the term of this patent is extended or adjusted under 35 U.S.C. 154(b) by 0 days.

(21) Appl. No.: 10/068,783

(22) Filed: Feb. 5, 2002

(65) Prior Publication Data

US 2003/0203081 A1 Oct. 30, 2003

(51) Int. Cl.⁷ .............................. A61L 9/04; A24F 25/00
(52) U.S. Cl. .............................. 239/53; 239/55; 34/446; 34/474; 252/188.28; 502/406
(58) Field of Search ............... 239/53, 55, 57, 239/67, 68; 34/446, 474, 358, 416, 472, 480, 483; 252/188.28, 400.1; 502/406; 95/45, 52, 54, 92, 116, 138, 231; 96/11, 118, 134–136, 294–296; 312/31, 31.01, 31.1; 206/484.1; 428/68; 427/245

(56) References Cited

U.S. PATENT DOCUMENTS

| | | | | |
|---|---|---|---|---|
| 4,384,972 A | * | 5/1983 | Nakamura et al. | 252/188.21 |
| 5,037,459 A | * | 8/1991 | Spruill et al. | 96/118 |
| 5,885,481 A | * | 3/1999 | Venkateshwaran et al. | 252/188.28 |
| 5,934,773 A | * | 8/1999 | Ferrell | 312/31.1 |
| 5,936,178 A | * | 8/1999 | Saari | 84/453 |
| 6,139,935 A | * | 10/2000 | Cullen et al. | 428/68 |
| 6,244,432 B1 | * | 6/2001 | Saari et al. | 206/213.1 |
| 6,436,872 B2 | * | 8/2002 | McKedy | 502/406 |
| 6,508,955 B1 | * | 1/2003 | Wu et al. | 252/188.28 |
| 6,646,121 B2 | * | 11/2003 | El Kabbani et al. | 536/123.13 |

* cited by examiner

Primary Examiner—Thomas Denion
Assistant Examiner—Kyle M. Riddle
(74) Attorney, Agent, or Firm—Angenehm Law Firm, Ltd; N Paul Friederichs

(57) ABSTRACT

A humidity control device for use in maintaining a desired humidity in packages of food, the device including a protective case, a water vapor permeable pouch and a thickened saturated solution, the solution having a suitable humidity control point for use within a food container. The device further employs a combination of an oxygen scavenger system to stop mold growth with anaerobic conditions and/or a mold inhibitor in the filling of the pouch or preferentially printed on the outside of the pouch.

46 Claims, No Drawings

PRESERVATION OF INTERMEDIATE MOISTURE FOODS BY CONTROLLING HUMIDITY AND INHIBITION OF MOLD GROWTH

FIELD OF THE INVENTION

The present invention relates to preservation of food products and more particularly to food systems including oxygen scavenging and chemical mold inhibitors for packaging of foods with water activity greater than 0.75 such as dry fruit, dough pie crust, jerky and dry cheeses in sealed packages for preserving the quality of the foods packaged therein.

BACKGROUND OF THE INVENTION

Efforts for preservation of food products go back many years. Perhaps one of the earliest methods for preserving food products was the drying of vegetable products. Many vegetable products naturally dried during the life cycle of the plants normal life, e.g., beans that dry on the plant. The beans and grains were stored for use during the winter season when the plants went through their dormant period. Later man learned the art of the smoking of meat products and the like as well as many other preservation methods.

As food science began to develop, man learned that certain food products were superior if they were maintained at a desired moisture content. Food products such as cheeses and meat jerky were preferably maintained at a particular moisture content.

It is well recognized that during cold weather, particularly in the Northern climes, the indoor moisture content may often be very low. This low humidity causes damage, for example the drying out of foods resulting in the ruination of the foods. The foods would become dried out which destroys the flavor of the foods. Some foods such as dried fruits become hard and lose desired succulent texture. This in turn reduces the enjoyment of the foods. Dry cheeses such as block Parmesan need to maintain a moisture content of about 26 to 32% and a water activity of 0.84. Slightly more moist cheeses such as Cheddar, Emmental or Gouda have moisture ranges of 30 to 38% water with water activity (AW) of approximately 0.95. Cheeses desirably are aged to develop flavor. Dried meat products such as jerky (28–34% water, Aw=0.75 to 0.80) or "hard" sausages (cervelat, or hard summer sausage 38–45% water, Aw 0.85) are also widely manufactured and distributed. The moisture content needs to be maintained in the desired range throughout the aging and the subsequent storage until consumed.

Since many molds grow readily at Aw greater than 0.85 and some grow significantly at Aw of 0.75, such meat and cheese products are commonly spoiled by surface mold growth. Since it is desirable to have as much water in the product to maintain a pleasing texture yet control the amount of mold growth, it is important to maintain the Aw of such products in a narrow range just lower than the Aw at which rapid mold growth occurs. Alternately, the growth of mold can be prevented by a very low oxygen environment or inhibited by compounds such as benzoic acid, sorbic acid, propionic acid, or other mold inhibitors. Such compounds are usually incorporated into the product or during manufacture, or deposited on the surface of the product by processes such as smoking.

Over the years, sophistication has developed in humidity control devices. Homes today often include a humidifier that is associated with the central furnace or heating system. Water is automatically fed into the humidifier. The water is exposed to warm moving air which picks up the moisture, carrying the water vapor throughout the home. Electronically controlled humidity regulators are very effective, but expensive and not very portable.

Desiccants have been used to completely or almost completely remove all the humidity in the air. Desiccants typically leave the humidity at or quite near 0%, or at levels lower than is acceptable in certain food environments.

In other instances environments may contain an excess amount of water vapor. Such a condition is typically confronted in the below ground level portion of the house, typically referred to as a basement. If the basement is located in a soil environment that contains high moisture, the moisture may move through the walls, e.g., concrete, of the basement raising the moisture content in the basement air to an unacceptably high level. High humidity occurs in many geographical locations such as the Pacific Northwest or the Gulf Coast in the United States. Unless well designed and operated storage spaces are used, products held for sale in such areas are subject to humidity high enough to allow mold growth.

Devices have been designed to lower the moisture content. Such devices are commonly referred to as dehumidifiers. These devices often work on a principle of refrigeration. The devices include a tubular coil through which a compressible fluid is passed. When the fluid is permitted to expand, the fluid rapidly lowers the temperature of the tubing. As moist air is passed over the tubing, condensation takes place on the tubing forming water which drops down into a removable pan. Periodically the pan is removed and emptied. All too often, the dehumidifier is forgotten, the pan overflows onto the floor and the water then evaporates, again raising the humidity.

Humidifying devices and dehumidifying devices of the type just described are generally not suitable for use in a package or case containing foods. The described humidifying devices and dehumidifying devices take up a substantial amount of space and simply will not fit within a small area. Attempts have been made to design small devices that fit within a small area.

Humidors today are available from tobacco shops for use with cigars. Such devices typically are glass and wood cases of sizes which typically are not portable. These devices may be anywhere from 12 inches by 12 inches by 5 inches or larger. Some humidors are large enough for several people to walk into simultaneously. The prior food cases which are humidified often use a sponge or a tube filed with water.

While such devices are commonly found today, these devices have inherent problems. For example, the humidifying cases may not be portable. The cases may be heavy and difficult to move. When an individual decides to take a vacation or would like to carry a few foods with him over a long period of time, these foods will become distasteful because the current devices are not portable. The prior humidifying cases generally have no control of the level of humidity. Prior devices are only designed to add water to the food environment. Some existing humidifying cases have problems with off flavors. Other existing humidifying cases tend to dry out the foods while others may get liquid water on the foods and result in molding.

One of the most serious problems with such storage of food products is the oxidation that takes place when the moisture content is at an undesirable level. Oxidation results in a rancid flavor in the food product, e.g., cheese or jerky.

One is confronted with two alternatives. One may leave the foods without a humidifying device and risk the foods drying out to such an extent that the foods lose all enjoyable flavors. Alternatively, one may place foods in a prior art humidifying case, of the type described, in which the case the foods will remain moist as long as they are consumed shortly after they are removed from the humidifying case. If the foods are not consumed shortly after being removed from the humidifying case, they may become distasteful because of oxidation. A financial loss as well as the loss of enjoyment may ensue from the loss of flavor of the foods.

SUMMARY OF THE PRESENT INVENTION

The present invention provides a device for controlling the relative humidity in an environment for foods. In addition, the present invention provides extra protection against mold growth by the presence of mold inhibitors such as potassium sorbate, sodium propionate, sodium benzoate, in the humidity controlling filling. Printing a concentrated solution of potassium sorbate or other inhibitor on the outside of the humidity regulator when graphics are applied to the humidity regulator further reduces mold growth. In addition, this invention may include an oxygen scavenger system that will reduce residual oxygen or oxygen that diffuses through the product packaging to maintain an oxygen level well under 1%, a level at which molds cannot grow.

The present invention utilizes a saturated aqueous solution of a solute such as an edible salt or a sugar or another soluble compound that inherently creates a desired relative humidity in the air space adjacent to the humidity control device. The solution includes a substantial amount of water in a fluid form as a saturated salt solution. The solution further includes a gel forming material such as analginate or xanthan. The combination of vegetable gum, water and salt provides a highly viscous fluid. In the present invention, the viscous solution is contained in a polymeric pouch. The polymeric pouch may be of a thin film of polyethylene (high density or low density), oriented polystyrene or the like. The pouch may be made from a Hyttel® (DuPont) film laminated to paper, non-woven polyester, or any suitable substrate. The pouch may be of nylon film, such as Capran® nylon film. The pouch may be of styrene-butadiene copolymer such as K-Resin® from Phillips Company. The solution may be a hydrocolloid including soluble gums (alginate, xanthan, pectin), a protein gel (egg albumen, gelatin) or inorganic polymer (silicate). The pouch further contains an oxygen scavenging material disposed in the solution.

The pouch may be protected within a rigid casing. A casing suitable for use in the present invention is a tube for example of ⅝ to 3.25" or smaller. The pouch may be placed within the cylinder and end caps placed on each end of the tube. The tube walls may have openings defined therein to permit the movement of water vapor through the tube walls. The pouch containing the salt gel may also be protected with an envelope, pouch, netting, or perforated plate that allows relatively free passage for water vapor, yet protects the more fragile salt pouch from mechanical damage. Alternately, the container for the salt pouch may be impermeable except for a window through which water vapor can freely pass.

Various salts may be used to prepare the salt solution. For example, the solute may be a single salt such as sodium chloride, sodium nitrite, potassium nitrite or a mixture of salts such as 50/50 potassium chloride and ammonium nitrate or a non-ionic compound such as sucrose. As another example, approximately a 50/50 by weight combination of potassium chloride and ammonium nitrate or ammonium carbonate and calcium chloride are suitable.

Several different anions and cations in almost any combination can be combined to produce the proper salt solutions. The anions which may be used include: nitrate, nitrite, chloride, bromide, fluoride, iodide, phosphate, monohydrogen phosphate, dihydrogen phosphate, bicarbonate, carbonate, sulfate, bisulfate, among many others. The cations which may be used include: lithium, sodium, potassium, rubidium, cesium, magnesium, calcium, ammonium, strontium, and barium.

Sugars, sugar alcohols, polybasic acids, and salts of polybasic acids may also be used to produce the proper solutions. Some of the sugars which may be used are sucrose, fructose, glucose, galactose, etc. Some of the sugar alcohols which may be used are sorbitol, xylitol, and mannitol. Some of the polybasic acids which can be used are citric, maleic, malic, and succinic. The salts of the polybasic acids which are usable are sodium citrate, sodium malate, and sodium tartrate.

Several different compounds are usable for creating the solutions. The following list is only a partial list of the compounds which are usable: lead chlorate, lead perchlorate, manganese chloride, mercuric nitrate, potassium dichromate, potassium permanganate, sodium chromate, aluminum nitrate, ammonium chloride, ammonium dihydrogen phosphate, ammonium bi-sulfite, barium bromide, cobalt sulfate, copper sulfate, copper nitrite, ferrous sulfate, and ferric bromide. Some combinations of anions can be reactive, unless the pH is maintained either on the basic side, or on the acid side of pH7.0, thus suitable buffer systems will be required to prevent undesirable reactions.

A solution of sodium chloride will provide a relative humidity at about 74%. The relative humidity measurements described herein are calculated at 70° F. If the humidity starts to fall below 74%, the salt solution gives up water to form moisture in the air until the air reaches a relative humidity of 74%. The water travels through the wall of the polymeric pouch and out through the various openings in the protective pouch case. On the other hand, if the moisture in the air around the present device rises above 74% relative humidity, the salt solution will pick up moisture from the air lowering the relative humidity to approximately 74%. A solution of sodium chloride with excess solid crystals of sodium chloride will provide a relative humidity of about 74%.

Some examples of humidity levels possible with single and mixtures of solutes are listed below. Some solutes that produce/maintain humidity levels in the 90% or higher range are: potassium sulfate at 97%; potassium nitrate at 92%; cesium iodide at 91%; and barium chloride at 90%. Some solutes that produce/maintain humidity levels between 80% and 89% are: potassium chloride at 84%; sucrose at 84%; ammonium sulfate at 81%; and potassium bromide at 81%. Some solutes that produce/maintain humidity levels between 70% and 79% are: sodium nitrate at 74%; sodium chloride at 74%; and strontium chloride at 71%. Some solutes that produce/maintain humidity levels between 60% and 69% are: potassium iodide at 69% and sodium nitrite at 66%. Some solutes that produce/maintain humidity levels between 50% and 59% are: sodium bromide at 58%; sodium dichromate at 55%; and magnesium nitrate at 53%. A solute that produces/maintains humidity levels in between 40% and 49% is potassium carbonate at 44%. Some solutes that produce/maintain humidity levels in between 30% and 39% are: sodium iodide at 38% and magnesium chloride at 33%. A solute that produces/maintains humidity levels in between 20% and 29% is calcium chloride at 29%. Some solutes that produce/maintain humidity levels between 18% and 6% are: lithium iodide at 18%; lithium qhloride at 11%; potassium hydroxide at 9%; zinc bromide at 8% and lithium bromide at 6%.

Other salts or combinations of salts can be used to obtain virtually any relative humidity. For example, a solution of sodium chloride, potassium nitrite and sodium nitrite of equal molar portions has a relative humidity of 31%. As another example, a solution of ammonium chloride and potassium nitrate has a relative humidity of 72%. Another suitable solute includes by weight 2 parts of sodium chloride and 1 part sodium nitrite which results in a relative humidity of 71%.

It has been found desirable in the instance of a food humidor holding 4, 6 or 8 foods to provide a pouch that is capable of passing at least 0.75 grams of water vapor per 24 hour period. This will permit maintenance of the proper humidity in the humidor with the humidor being opened up to five times in an environment of less than 30% relative humidity. In most use situations of the present invention a preferred water vapor transmission rate may be in the range of 1 to 3 grams per day per for a conventional pocket wood humidor. The preferred water activity is 65 to 95, and the more preferred is 75 to 85. This allows for a reasonably quick restoration of equilibrium in the chamber, e.g., about 2 hours.

The water vapor transmission rate (WVTR) is determined by the type of film used and the thickness of the film. The total transmission is also affected by the area exposed to the chamber as well as the solution. For example, a 0.5 mu polyvinylchoride film will transmit about 8 grams per 100 square inches in 24 hours, while a 1.0 mil film of the same material will transmit about 3 or 4 grams in the same time period. The latter is on the lower end of the practical range for many uses.

Ideally, the rate should be approximately 10 grams moisture per 100 square inches per 24 hours. The usable (practical) range for most applications is 5 to 15 grams per 100 square inches per 24 hours. The possibility exists to use rates as low as 0.1 grams per 100 square inches per 24 hours if a necessity exists to maintain a humidity level in a chamber that has very little, if any, permeation of moisture vapor through the walls or if one is willing to build a pouch with a very large surface area.

Ideally, one would like to have a very large rate, i.e., 15+ grams per day. However, it has been found that undesirable seeping may occur if the transmission rate exceeds 25 grams per 100 square inches per day. Using a good firm gel inside of the pouch mitigates this seepage problem significantly, but not completely. Hytrel® film from a DuPont resin extruded on a suitable substrate has demonstrated WVTRs of 15 to 25 with film thicknesses of 1.5 to 0.75 mu. Films may become available in the future with even higher WVTRs and be suitable for these applications.

An important function is to get as much transmission of vapor as possible and practical because it is preferable to reestablish equilibrium in a chamber as quickly as possible. The higher the transmission rate, the better the performance in retaining the proper moisture level in the material being protected in the chamber. The preferred range of water vapor transmission should be on the order of 1 to 3 grams per day for restoration and maintenance of humidity in a 2 inch by 4 inch by 10 inch chamber where foods are stored.

While one could make a regulator with a surface of 100 or more square inches, these would be rather cumbersome and awkward to employ. If the film passes 5 to 10 grams of water vapor per 100 square inches in 24 hours, one only needs to make a pouch of approximately 10 to 20 square inches to fulfill the performance requirements.

Typical films that meet the requirements of the present invention include food wrap films of polyvinylchloride, microfiberous polyethylene (TYVEK® from Dupont), Hytrel® (DuPont), microporous polyethylene, high density polyethylene, oriented polystyrene, cellophane, polycarbonate, and the like that have WVTR of 3 grams or more.

Several other films may be used. The following is a list of possible materials which the films can be made from: polyester, polyamides, polyurethane, ethylcellulose, cellulose acetate, polybutylene, polyethylene terphatlate, polyvinylchoride, nylon, polyvinylfluoride, ethylenevinylacetate K-Resins and polyvinylalcohol. A variety of copolymers and laminates may also be used. Films can be made from rubbers with suitable properties as well.

Other types of films may be used. Very thin versions of low density polyethylene, polystyrene, or polypropylene and the like are also functional but may lack strength, but can be protected by a screen or a lower grade of a material like TYVEK film (microfiberous polyethylene). However, these thin films are more difficult to fabricate with leak-free seams.

The oxygen scavenger material that serves to scavenge oxygen and is compatible with the present system of saturated salt solution. One such scavenger material is a reduced powdered iron.

DETAILED DESCRIPTION OF THE PRESENT INVENTION

The present invention comprises a humidity control device including a case with a plurality of openings, a polymeric pouch having walls sufficiently permeable to permit migration of water through the film in the form of water vapor and yet thick enough to prevent the escape of liquid water, and a solution including an organic or an inorganic solute (e.g., salt or sugar), vegetable gum and water. The humidity control device includes oxygen scavenging material disbursed in combination of solute, vegetable gum and water.

The saturated solution contains excess solute (e.g., salt or sugar crystals) and is preferably made more viscous with a thickening agent. In some select situations, a fungicide or inhibitor as well as a small amount of a buffering salt mixture may be necessary or desirable.

The case may be of any suitable size and shape. For use with small package containing only 3 or 4 foods, the device will be rather small for example 2 to 5 inches in length and perhaps ½ inch to 1 inch in diameter. Alternatively, when a larger reservoir of moisture control is necessary, the pouch may be pillow-like of sufficient mechanical properties of substantially larger dimensions. For example, a pouch of 2.5 inches by 5.5 inches could contain about 2.5 ounces of solution or a pouch of 3.5 inches by 7 inches could contain about 4 ounces of solution. Much larger pouches can be designed to accommodate needs for large reservoirs such as for bulk storage of jerky. Pouches with dimensions larger than 5×5 should be segmented by incorporating a heat seal across one or both dimensions of the pouch to prevent the filling from collecting at the lowest part of the pouch during storage with the product. Multiple pouches are normally needed in larger chambers (100 cubic inches) unless provisions are made to circulate the air in the chamber. For certain applications, the container may be of an impermeable material with a window of a film with suitable water vapor transmission properties. On the other hand, the case may be much larger for use in conjunction with a large number of foods, perhaps 8 to 10 inches in length and 1½ to 2 inches in diameter. The case may be of any suitable material, for example, a polymer, metal, glass, ceramic, wood, etc. The preferred material is flexible polyethylene, or a similar material, or a rigid polystyrene, or a similar material, for most applications. The case may also be made from netting or felt-like material such as paper, cloths, fur felt, plastic fibers, etc. However, other materials may be suitable as well. For example, wood may be used in expensive units where aesthetics are important. The case may have an operable end portion for receipt of the pouch and salt solution. The internal container zone may be for example circular, rectangular, or triangular in cross section. The device may even be spherical in shape. Generally, it is advantageous to have maximum surface area per unit volume. The wall of the case has defined therein a plurality of small openings. In one preferred embodiment the openings were oval in shape being approximately 1/16 inch by 1/8 inch in open area. The openings may be provided adjacent to each other with sufficient adjacent wall structure to provide the strength and protection desired to prevent damage to the pouch. One preferred device according to the present invention contained 20% open area. The strength requirement is dependent on the application and the abuse to which the case may be subject.

The pouch of the present invention may be constructed of any polymeric material such as polyethylene, polystyrene, polyvinylchloride, polybutylene, polycarbonate, cellophane, microporous polyethylene, microfiberous polyethylene, nylon and the like that will provide the porosity necessary for the movement of the water vapor and retention of liquid water. The most suitable materials are polyvinylchloride—shrink wrap, polyvinylchloride, microporous polyethylene and microfibrous polyethylene. Other suitable materials are K-Resin (from Phillips Petroleum), low density polyethylene if less than 0.3 mil thick, cellophane (brittleness may be a problem), and polystyrene films of 0.5 mu or less, thin polycarbonate, etc. Typically the film from which the pouch is constructed will have a thickness of 0.75 to 1.5 mils. The film may be as thin as 0.15 mils or thinner. Depending upon the polymer from which the pouch is made, the film may have a thickness of 1 mil or greater, providing sufficient moisture migration can take place through the film. As a general matter, thinner film is preferred providing the strength of the film is sufficient to avoid rupture during normal use.

Films are characterized by moisture transfer rates, the preferred rate of moisture transfer in the films of the present invention may be as low as 0.3 grams per 100 square inches per 24 hours in situations where there is little or no change in temperature and the container is substantially sealed with negligible moisture vapor transmission. The preferred rate is in the range of about 10 to 25 grams per 24 hours per 100 square inches of film. Because of the cost and manufacturing considerations, the useable range for most applications is 5 to 15 grams per 24 hours. Rates as low as 0.3 grams per 100 square inches per 24 hours may be adequate if the chamber has very little, if any, permeation of moisture vapor through the walls or if a pouch with a very large surface area is built.

The solution of the present invention may be any suitable solute which has a saturated solution at 20% solute in water (percent by weight of solute in weight of solution) as a minimum and any solute that will provide a saturated solution at 75% solute in water (percent by weight of solute in weight of solution) as a maximum. The preferred range of solubility is 25 to 80%. The preferred saturated solution contains 60% solute and 40% water to 30% solute and 70% water, however, the maximum range contemplated in the present invention provides a saturated solution at 5% solute and as high as 90% solute by weight. A suitable solution may include a 50/50 combination of ammonium nitrate and potassium chloride. This solution will provide a relative humidity slightly less than 70%. Some acids (e.g., 2% citric acid) may be added to lower the pH, for example to pH 5 or lower, to convert any free ammonia to the ammonium ion.

Some sugars may be suitable. Sucrose is suitable, but works at a slower rate than salts. Glucose and fructose work well for disposable pouches. These two sugar solutions work for five to ten cycles. Sodium chloride is a preferred salt which is used in a large range of applications because of its humidity (CA 75%), good solubility (25%), non-toxicity, and cost. Other salts or solutes would be used if a different humidity is desirable.

The salt solution of the present invention may be thickened with a vegetable gum or other hydrocolliod. The vegetable gum must be suitable for use in the concentrated salt solution. The preferred thickeners are propylene glycol alginate and brine tolerant xanthan. Other usable vegetable gums are pectin, guar, arabic, tragacanth, or starches. Some microbial gums which are usable are: gellan and xanthan. Some seaweed gums are usable: such as carrageenan, alginate such as sodium alginate or calcium alginate. Some synthetic gums which are usable are: carboxymethyl cellulose and propyleneglycol cellulose. Since many of these gums are unstable thickeners for saturated salt solutions, the resulting syneresis of saturated salt solutions requires 100% integrity of pouch seals. The preferred concentration is at 0.5 to 2% of the total solution which gives viscosity ranges in excess of 2500 cps which is acceptable to an actual gel. Such a viscosity is adequate to maintain a uniform suspension of the excess solute during filling of the pouches with the solution. A thixotropic or shear thinning gel is preferred for manufacturing purposes. While viscosities between 1500 cps and 5000 cps will work, the preferred viscosity is 7500 cps. Viscosities of less than 2500 cps can be used with proper seals at the seams. Hydrocolliod systems that form non-flowing gels are useable as well.

The oxygen scavenger material may be any material that will capture oxygen at a desired rate and serve to maintain the oxygen level in a suitable range. The preferred material is a reduced powdered iron. The amount of reduced iron in the filling depends on the amount of oxygen removal is desired (measured in milliliters) and the amount of filling in the particular humidity regulator pouch. For example, if an 8-gram pouch must remove 100 ml of oxygen, the filling must have approximately 41 g of iron powder per kilogram of filling, or about 0.33 g of iron per pouch. The oxygen scavenger material may further include ferrous sulfate, manganous sulfate and sodium carbonate or a pH buffer system to maintain a pH of at least 7.75 to prevent reaction of the iron powder to produce a hydrogen gas.

If desired the present humidity control device may include a mechanism for securing the device in place such as in the food package. One suggested approach is the use of VEL-CRO® mounting, a hook and loop mechanism, in the package.

OPERATION OF THE PRESENT INVENTION

The present invention is assembled by placing the pouch containing the thickened saturated salt oxygen scavenger solution within the container zone of the case. The case is then enclosed, for example, by securing the end portions to a tubular case. The case is then placed in the food package in a secure location. It may, for example, simply be loose within the food package. The device may be secured in a desired location using VELCRO® mounting (a hook and loop mechanism), plastic clips or the like. For a case, such as a large food case, a plurality of pouches may be used to increase the humidity within a reasonable time.

If humidity is above the certain humidity characteristic of the salt solution, the water vapor will be removed from the air and held within the salt solution until the humidity has returned to the predetermined point. On the other hand, if the air surrounding the device falls below the characteristic humidity point, water vapor will be given off by the salt solution so the air will return to that point.

EXAMPLES OF THE PRESENT INVENTION

Example 1A

The following is a preferred embodiment of the present invention. A gel combination was prepared including 1800 grams water (155° F.), 570 grams potassium chloride, 330 grams sodium chloride, 25 grams xanthan gum, 6 grams sodium citrate and 5 grams potassium sorbate. The water activity was found to be 0.80 and the pH was 7.2. The oxygen scavenging composition of the present invention was then prepared by combining 1000 grams of this gel with a combination of 20 grams powdered iron (200 mesh), 1 gram ferrous sulfate, 1 gram manganous sulfate and 1 gram sodium carbonate. Approximately 10 grams of the filing were placed in a pouch prepared from a Hytrel® film, 1.5 mil, on a paper substrate and the pouch was placed in a commercial Jerky product. Highly satisfactory results were obtained showing the effectiveness of the present invention for reducing degradation of the Jerky during storage.

Example 1B

A filling was prepared for a beef jerky application with and without an oxygen scavenger as well as a set of beef jerky without the present invention:

To a 6 quart bowl of a planetary mixer, add:

| | |
|---|---|
| Water, 145 F. | 3000 g |
| Brine tolerant Xanthan | 5 g |
| Potassium Chloride | 225 g |
| Potassium Sorbate | 10 g |

Mix for 2 minutes, allow to stand for 5 minutes to hydrate the gum.
Then add:

| | |
|---|---|
| Potassium Chloride | 725 g |
| Sodium Chloride | 550 g |
| Sodium Citrate | 10 g |

The Potassium Sorbate was added to the filling to inhibit mold growth inside of the packet during storage. It has been noted that very slow mold growth has occurred on fillings with water activities of 0.8 or higher.

Pouches, 2×2½ inches, prepared from Hytrel® film on a non-woven base were filled with approximately 8 g of the above filling. These pouches were placed in 4 oz bags of beef jerky, flushed with nitrogen and placed into storage at 0, 70 and 100° F. at 25 to 40% Relative Humidity. The rate of degradation at 100° F. is assumed to be approximately four times as fast as at 70° F. (This assumption was supported by the observation that the rate of moisture loss through the jerky package was 3.9 times greater at 100° F. than at 70° F. Moisture loss from the package at the 0° F. controls).

Upon removal from the storage condition, the jerky was analyzed for several factors including Water Activity (Aw) with an Aqualab dewpoint meter and headspace oxygen with an oxygen analyzer.

Example 2-S

To: Filling from the batch described above as I-S 1050 g
Add:

| | |
|---|---|
| Reduced iron, 200 mesh | 25 g |
| Ferrous sulfate, Tetrahydrate | 3 g |
| Manganese sulfate, Heptahydrate | 1 g |

Pouches were prepared, placed into beef jerky and stored as described above.

Pertinent data from this storage test is summarized in this table:

| | Line Control | Control w/Humidipak | Humidipak w/Scav |
|---|---|---|---|
| Mean, % Oxygen | 0.0714 | 0.0500 | 0.0786 |
| Std. Deviation | 0.0825 | 0.0674 | 0.0699 |
| Std. Error | 0.0221 | 0.0195 | 0.0187 |
| Variance | 0.0068 | 0.0045 | 0.0049 |
| Range, % Oxygen | 0.2 | 0.2 | 0.2 |
| Number | 14 | 12 | 14 |
| Water Activity, initial | 0.78 | 0.81 | 0.79 |
| Water Activity, 240 days | 0.73 | 0.78 | 0.77 |

While the Humidipak with scavenger sample was the lowest performer of the trio, there is no statistical difference between the three sets of samples. The control with Humidipak (consisting of an "Everfresh" oxygen scavenger packs and a plain Humidipak humidity regulator) was probably aided by the higher humidity in jerky package as such commercial oxygen scavengers work better at higher humidity levels. The Humidipak with a scavenger performed well within a margin of error or requirement as oxygen levels below 1% are highly inhibiting and levels below 0.5% are virtually completely inhibiting of mold growth.

The capacity of the scavenger system which is primarily determined by the amount of iron powder added to the filling. For example, the reaction is:

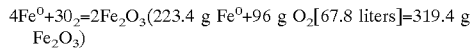

$$4Fe^0 + 3O_2 = 2Fe_2O_3 (223.4 \text{ g } Fe^0 + 96 \text{ g } O_2 [67.8 \text{ liters}] = 319.4 \text{ g } Fe_2O_3)$$

One gram of $Fe^0$ will react with 303 ml oxygen, or 1 mg $Fe^0$ will eliminate 0.30 ml of oxygen, thus 3.3 mg of $Fe^0$ is needed for each ml of oxygen removal capacity. Then 330 mg of $Fe^0$ must be incorporated into the filling of each pouch to remove 100 ml of Oxygen. Manufacturers will determine the capacity needed for a particular application. The beef jerky manufacturers would likely use 50 ml for the 2 oz packages and 50–100 ml range for 4 oz packages.

Example 2

The present invention was compared in a controlled testing environment as follows: 25 samples of jerky were prepared as set forth in Example 1. Twenty-five samples of jerky were prepared in a similar manner except the gel pouch was replaced with a standard 50 ml commercial oxygen scavenger. The commercial oxygen scavenger was obtained from Mitsubishi Corp. and samples of jerky were prepared as a control having no scavenger placed in the jerky package. The samples were all subjected to an accelerated storage test for 30 days at 100° F. The following results were obtained on twelve samples of:

|  | Commercial Product (with dry scavenger packet) | Control Filling (with dry scavenger) | Present Inv. |
|---|---|---|---|
| Weight loss, g | 1.98 g | 2.08 | 2.25 |
| Headspace Oxygen % | 0.1 | 0.2 | 0.1 |

Similar testing was carried out at room temperature for 45 days and the following results were obtained on 10 samples of.

|  |  |  |  |
|---|---|---|---|
| Weight loss, g | .0.55 | 0.61 | 0.56 |
| Headspace Oxygen % | 0.0 | 0.1 | 0.0 |

Example 3

The following is an example of the present invention. Approximately 40 grams of propylene glycol alginate (Kelcoloid HVF, Kelco Corp.) was thoroughly blended with 200 grams of sodium chloride. This mixture may be added to 250 ml tap water at room temperature with vigorous stirring until the suspension is homogeneous to the naked eye. A combination of 20 parts reduced powdered iron of a 200 mesh size, 1 part ferrous sulfate, 1 part manganous sulfate and 1 part sodium carbonate may be added to the gel and thoroughly dispersed. This gel may be placed into tubes of 0.35 or 0.7 mil polyethylene tubing, sealed and inserted into a perforated tube, ½ inch internal diameter and ⅝ inch external diameter. This unit is suitable for inclusions into a food package or case of approximately 6 inches by 4 inches by ¾ inch. A pouch containing 7 grams of the above gel was placed in water at room temperature (20° C.). The pouch gained approximately 0.3 grams of water per hour until all of the salt was dissolved upon which no further absorption occurred. The moisture was 0.07 grams per day per unit, and relative humidity was 74%.

Example 4

The following is an example of the present invention. One-hundred fifty (150) grams of potassium chloride and 160 grams of ammonium nitrate may be blended with 15 grams of Kanthan gum (Kelco BT). This is stirred into 300 ml of water. A combination of 20 parts reduced powdered iron of a 200 mesh size, 1 part ferrous sulfate, 1 part manganous sulfate and 1 part sodium carbonate may be added to the gel and thoroughly dispersed. The resulting gel is placed into pouches of 0.7 mil K-resin film, sealed and placed into 3.25 inch tubes prepared from low density polyethylene netting material. These flexible tubes may be inserted into slots prepared in pocket sized foods humidors. The relative humidity at 20° C. may be approximately 72%, and the moisture loss per cylinder may be 0.08 grams per day. The tubes are suitable for use in packages of dry cheese.

Example 5

Four hundred (400) grams of sugar (sucrose) and 12 grams of pregelatinized tapioca starch may be added to 160 grams of water in a blender. Upon blending, a pourable thickened suspension is obtained. A combination of 20 parts reduced powdered iron of a 200 mesh size, 1 part ferrous sulfate, 1 part manganous sulfate and 1 part sodium carbonate may be added to the gel and thoroughly dispersed. Forty (40) to fifty (50) gram portions are placed in pouches prepared from microfibril polyethylene (TYVEK®) coated with a heat sealing adhesive. The pouches would be suitable for use in packages of cheddar cheese.

Example 7

About 1200 grams of saturated potassium chloride solution (in water) may be treated with a blend of 250 grams of powdered potassium chloride and 60 grams of propylene glycol alginate (Kelcoloid HVF) in a blender. A combination of 20 parts reduced powdered iron of a 200 mesh size, 1 part ferrous sulfate, 1 part manganous sulfate and 1 part sodium carbonate may be added to the gel and thoroughly dispersed. The gelled material may be placed into pouches prepared from microfibril polyethylene (TYVEK®) with a heat sealing adhesive. These pouches may measure 2.25×6.5 inches and contain about 50 grams of gel. The pouches were suitable for use in packages of cheddar cheese.

Example 8

A 1.5 mil nylon film approximately 3.5 inches wide may be attached to a filling machine and the RF seamer adjusted to properly to make a tube of about 1 inch in diameter. A salt solution may be prepared by mixing 1.2 lb of brine tolerant Xanthan gum with 8 pounds of fine crystalline sodium chloride. This premix may be added to 65 lbs. of water in a jacketed paddle mixer with "moderate" agitation. The temperature may be raised to 65° C. by injecting steam with continuing agitation. Within 5 minutes, the contents of the mixer will become a homogeneous gel, to which 28 pounds of salt may be added. A combination of 20 parts reduced powdered iron of a 200 mesh size, 1 part ferrous sulfate, 1 part manganous sulfate and 1 part sodium carbonate may be added to the gel and thoroughly dispersed. A commercial process cheese chub filling machine may be fitted with a 1 inch mandrel. The gel may be injected into the nylon film tube. The filled tube may be divided into five inch chubs sealed by wire clips at each end. The pouches would be suitable for use in packages of dry cheese.

Example 9

Hytrel® film or paper was printed with approximately 160 mg of potassium sorbate per 100 square inches, Pouches, 2×5 inches (20 square inches) were prepared and filled with a filling having a water activity of 0.78 (Example 1, above). Two additional portions of this filling were added, 0.2%, potassium sorbate, 1.0% potassium sorbate, 0.5% sodium propionate, and a control with no treatment giving 5 variations.

Macanudo Maduro (dark wrapper) cigars were placed in a plastic bag with four slightly moldy cigars. The bag was tumbled to inoculate the experimental cigars with mold spores.

The control and experimental packets were placed in 5×10 inch, 4 mil recloseable plastic bags with 3 inoculated cigars, stored at room conditions and monitored visually for about 8 months.

Mold spots began to appear after about 3 months on the controls. About a month later spots appeared on the filling with 0.2% Potassium Sorbate.

At 5 months, all samples had observable white mold spots. By the end of the experiment, there was significant mold on the controls and the Sorbate filling. The other samples had noticeably less mold on the surfaces of the cigars, particularly on surfaces closest to the packets and more on cigar surfaces more removed from the experimental packets.

What is claimed is:

1. A humidity control device for use in a food case for maintaining a desired humidity, said device comprising a protective case, a water vapor permeable pouch and a thickened saturated salt solution, said food case comprising wall means defining an enclosure, said wall means including a plurality of openings through which water vapor may freely move, said pouch being formed of a thin wall polymer film through which water vapor may pass, said thickened saturated salt solution comprising water, salt and a thickening agent, said salt being present in an amount between 20 and 75 percent by weight based on the weight of the combination of water and salt, said thickening agent being present in an amount sufficient to thicken the salt solution, said thickened saturated salt solution being contained within the polymeric pouch and sealed from escape from the pouch, said pouch containing the thickened saturated salt solution being contained within the protective case to protect the pouch from rupture, and wherein the pouch provides moisture in the range of about 0.5 to 25 grams per 24 hours in an environment with a relative humidity of less than 5%.

2. The humidity control device of claim 1 wherein the pouch provides moisture in the range of about 10 to 25 grams per 24 hours in an environment with a relative humidity of less than 5%.

3. The humidity control device of claim 1 wherein the pouch provides moisture in the range for most applications is 5 to 15 grams per 24 hours in an environment with a relative humidity of less than 5%.

4. The humidity control device of claim 1 wherein the pouch provides moisture in the range for most applications is 0.5 to 10 grams per 24 hours in an environment with a relative humidity of less than 5%.

5. The humidity control device of claim 2 wherein the polymer film is a member selected from the group consisting of thermoplasstic polyester film, high density polyethylene, polyvinylcholride, oriented polystyrene, microporous polyolefin, and microfiberous polyolefin.

6. The humidity control device of claim 1 wherein the salt solution comprises a 60/40 mixture of NaCl and KCl by weight.

7. The humidity control device of claim 1 wherein the thickening agent comprises propylene glycol alginate.

8. The humidity control device of claim 1 wherein the thickening agent comprises brine tolerant xanthan.

9. The humidity control device of claim 1 wherein the case comprises a tubular structure having openings of between about 1/18th inch by 1/8th inch.

10. The humidity control device of claim 9 wherein the case includes a pair of removable end caps.

11. The humidity control device of claim 10 wherein the case is constructed of a polymer.

12. The humidity control device of claim 10 wherein the case is about 2 to 5 inches in length and 5/8th to 3/4 inches in internal diameter.

13. The humidity control device of claim 10 wherein the device includes a securement mechanism for attaching the device to the inside of a food case.

14. A humidity control device for maintaining a desired humidity said device comprising a protective case, a water vapor permeable pouch and a thickened saturated salt solution, said case comprising wall means defining an enclosure, said wall means including a plurality of openings through which water vapor may freely move, said pouch being formed of a thin wall polymer film through which water vapor may pass, said thickened saturated salt solution comprising water, salt and a thickening agent, said thickening agent being present in an amount sufficient to thicken the salt solution, said salt solution being contained within the polymeric pouch and sealed from escape from the pouch said pouch containing the thickened salt solution, said pouch being contained within the protective case to protect the pouch from rupture, and wherein the salt solution has a viscosity of 1500–10,000 cps in an environment with a relative humidity of less than 5%.

15. The humidity control device of claim 14 wherein the saturated salt solution has salt present at a level of 5% to 90% salt by weight.

16. The humidity control device of claim 15 wherein the salt solution has a viscosity of 7500–10,000 cps.

17. The humidity control device of claim 15 wherein the salt solution has a viscosity of 2500–7500 cps.

18. The humidity control device of claim 15 wherein the salt solution has a viscosity of 1500–5,000 cps.

19. The humidity control device of claim 15 wherein the salt solution is a self-standing non-flowing gel.

20. The humidity control device of claim 15 wherein the polymer film is a member selected from the group consisting of high density polyethylene, oriented polystyrene, microporous polyethylene, microfiberous polyethylene and polyvinylchloride.

21. The humidity control device of claim 15 wherein the film has a moisture transfer rate of at least 0.1 grams per 100 square inches per 24 hours.

22. The humidity control device of claim 15 wherein the film has a moisture transfer rate in the range of about 10 to 25 grams per 24 hours per 100 square inches of film.

23. A method of controlling the humidity in a foods case comprising applying a humidity control mechanism to environment in the foods case, said mechanism including an encased saturated salt solution, said encasement being permeable to water vapor to permit water vapor to leave the salt solution if the adjacent relative humidity is below a desired level and to pick up water vapor if the relative humidity is above a desired level, said encasement containing 0.25 to 7.5% oxygen scavenger and a mold inhibitor.

24. A humidity control device for use in maintaining a desired humidity, said device including a water vapor permeable pouch and a thickened saturated salt solution, said pouch being formed of a thin wall polymer film through which water vapor may pass, said thickened saturated salt solution comprising water, salt, and a thickening agent, said salt being present in an amount of between 20 and 75 percent by weight based on the weight of the combination of water and salt, said thickening agent being present in amount sufficient to thicken the salt solution, said salt solution being contained within the polymeric pouch and sealed from escape from the pouch, said pouch containing the thickened salt solution being contained within a protective case to protect the pouch from rupture, and the pouch containing 0.25 to 75% oxygen scavenger and a mold inhibitor.

25. The humidity control device of claim 24 wherein the polymer film has a thickness of between 0.15 mils and 2.0 mils.

26. The humidity control device of claim 24 wherein the polymer film is a member selected for the group consisting of high density polyethylene, oriented polystyrene, polyvinylchloride, microporous polyethylene, thermoplastic polyester film, and microfiberous polyethylene.

27. The humidity control device of claim 26 wherein the salt solution comprises approximately a 60/40 mixture of KCl and NaCl by weight.

28. The humidity control device of claim 27 wherein the thickening agent comprises xanthan gum.

29. The humidity control device of claim 24 wherein said thickening agent is a member selected from the group consisting of hydrocolloids and propylene glycol alginate.

30. The humidity control device of claim 24 wherein said thickening agent is a member selected from the group consisting of soluble gums, protein gels and inorganic polymers.

31. The humidity control device of claim 24 wherein said thickening agent is a member selected from the group consisting of alginate, xanthan, and pectin.

32. The humidity control device of claim 27 wherein said thickening agent is a member selected from the group consisting of egg albumen and gelatin.

33. The humidity control device of claim 27 wherein said thickening agent comprise silicates.

34. The humidity control device of claim 27 wherein said salt comprises a cation member selected of ammonium, sodium, potassium, calcium, magnesium, lithium, strontium and an anion member selected from the group consisting of chloride, iodide, bromide, nitrite, nitrate, carbonate, phosphate, sulfate, and citrate.

35. The humidity control device of claim 27 wherein said salt is a member selected from the group consisting of sucrose, sorbitol, mannitol, glucose, 1- methylglucose, xylitol, sodium or potassium acetate, citric acid, and sodium citrate.

36. A humidity control device for use in maintaining a desired humidity, said device including a water vapor permeable pouch and a saturated solution, said pouch being formed of a thin wall polymer film through which water vapor may pass, said saturated solution comprising water and solute, said solute being present in an amount of between 20 and 75 percent by weight based on the weight of the combination of water and solute, said solution being contained within the polymeric pouch and sealed from escape from the pouch, the pouch containing 0.25 to 7.5% oxygen scavenger.

37. The humidity control device of claim 36 further comprising between 1 and 5 percent of reduced iron with particle size of between 100 and 325 mesh.

38. The humidity control device of claim 36 further comprising between 0.25 and 7.5 percent of reduced iron with particle size of between 100 and 325 mesh and a means for increasing the pH to greater than 7.0.

39. The humidity control device of claim 36 further comprising between 0.5 and 7.5 percent of metallic zinc powder means for increasing the pH to greater than 7.0.

40. The humidity control device of claim 36 further comprising a metal powder selected from the group consisting of manganese, chromium, cobalt, and nickel and a means for increasing the pH to greater than 7.0.

41. The humidity control device of claim 36 further comprising 0.001 to 0.05 percent of catalytic salt having a cation selected from the group consisting of ferrous and manganese$^{++}$ and the anion selected from the group consisting of sulfate and chloride.

42. The humidity control device of claim 36 further comprising between 0.025 and 0.2 percent of a mold inhibitor wherein the mold inhibitor is selected from the group consisting of sodium propionate, potassium propionate, calcium propionate, potassium sorbate, sorbic acid, benzoic acid, and sodium benzoate.

43. The humidity control device of claim 36 further comprising a potassium sorbate coating applied to the surface of the pouch at a rate of between 50 and 300 mg. per 100 square inches of surface using a process selected from the group consisting of spraying, dipping, and printing.

44. The humidity control device of claim 36 further comprising a potassium sorbate coating applied to the surface of the pouch at a rate of between 100 and 200 mg. per 100 square inches of surface using a process selected from the group consisting of spraying, dipping, and printing.

45. The humidity control device of claim 36 further comprising a propionate coating applied to the surface of the pouch at a rate of between 50 and 300 mg. per 100 square inches of surface, the propionate coating selected from the group consisting of sodium propionate, potassium propionate and calcium propionate, and using a process selected from the group consisting of spraying, dipping, and printing.

46. The humidity control device of claim 36 further comprising a benzoate coating applied to the surface of the pouch at a rate of between 25 and 200 mg. per 100 square inches of surface, the benzoate coating selected from the group consisting of sodium benzoate and potassium benzoate, and using a process selected from the group consisting of spraying, dipping, and printing.

* * * * *